UNITED STATES PATENT OFFICE.

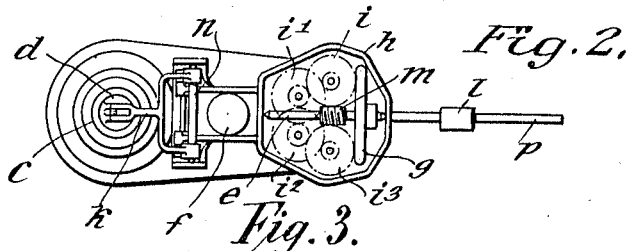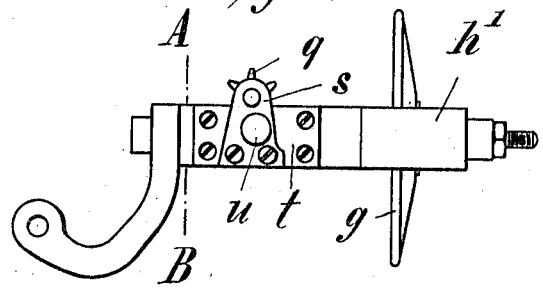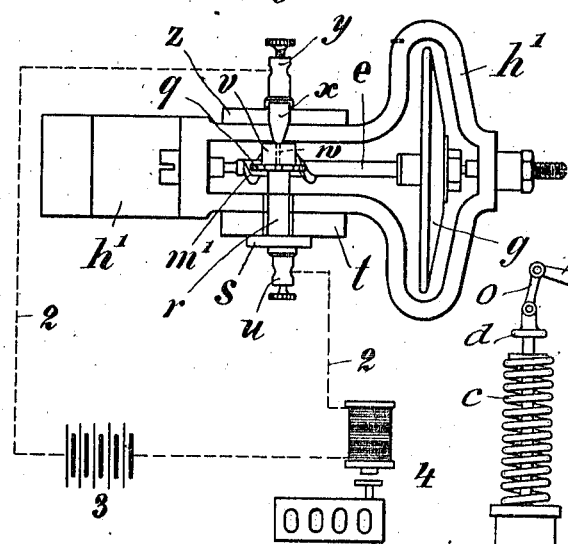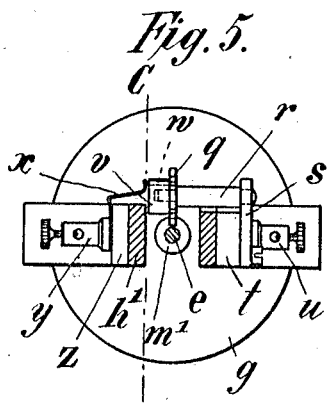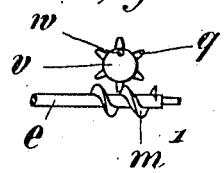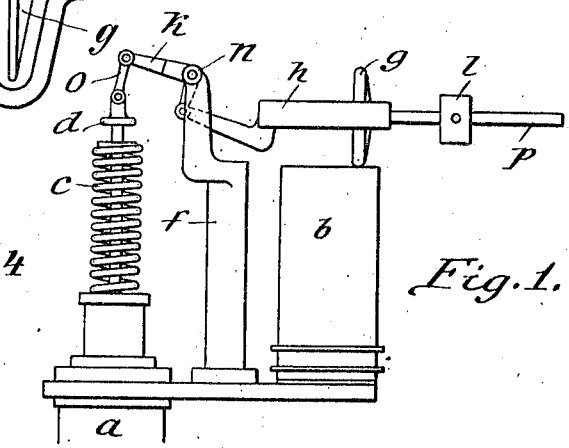

ANTON FRIEDRICH CLAUS BÖTTCHER AND LUDWIG WILHELM LEHMANN, OF HAMBURG, GERMANY, ASSIGNORS TO THE FIRM OF H. MAIHAK, OF HAMBURG, GERMANY.

COUNTING APPARATUS FOR THE INDICATED OUTPUT OF PISTON-ENGINES.

1,039,250.

Specification of Letters Patent. Patented Sept. 24, 1912.

Application filed November 8, 1909. Serial No. 526,828.

*To all whom it may concern:*

Be it known that we, ANTON FRIEDRICH CLAUS BÖTTCHER and LUDWIG WILHELM LEHMANN, both subjects of the German Emperor, and residents of Hamburg, Germany, have invented certain new and useful Improvements in Counting Apparatus for the Indicated Output of Piston-Engines, of which the following is a specification.

The invention relates to improvements in counting apparatus for the indicated output of piston engines.

With the usual indicator methods, in which diagrams are only taken from time to time it is only possible to determine the mean indicated output of piston engines with sufficient accuracy when the fluctuations in the power are inconsiderable. If the separate diagrams differ considerably one from the other as is most generally the case in practice, the results obtained by this method are very inaccurate.

The object of the present invention is the continuous exact registration of the output or power in a manner which can be observed instantly at any time, by means of an apparatus which can be fitted to any indicator and used therewith as desired.

The apparatus is diagrammatically illustrated together with an indicator in the accompanying sheets of drawings in which—

Figure 1 is a side elevation and Fig. 2 a plan. Fig. 3 is a side elevation of a modified embodiment of the counting apparatus adapted to operate an electromagnetic counter and reading device at a distance. Fig. 4 is a plan of the modified apparatus in connection with an electric battery and a remote counter and reading device. Fig. 5 is a section on the line A—B of Fig. 3. Fig. 6 is a section on the line C—D of Fig. 5 showing the contact device for making and breaking circuit.

Similar letters of reference refer to like parts throughout the figures.

$a$ designates the upper part of an indicator, $b$ the indicator drum, $c$ the spring and $d$ the upper end of the indicator piston rod. $f$ is an upright constituting the support for the counting apparatus or power meter.

The counting apparatus or power meter itself consists of a friction roller or wheel $g$ fixed on a spindle $e$ journaled in a casing or framing $h$, revolutions of the wheel $g$ or its spindle respectively being transmitted by means of a worm $m$ to the disks $i, i^1, i^2, i^3$ of a suitable counter mechanism mounted in the framing $h$. The latter is pivotally connected with an arm of a bell crank lever $k$ with the friction wheel $g$ resting on the upper end of the indicator drum $b$. The bell crank lever $k$ is rocked on its pivot $n$ by the up and down movements of the piston rod $d$ connected by means of a link $o$ to the bell crank lever $k$ which itself produces a radial displacement of the friction wheel $g$ on the upper end face of the indicator drum $b$. By this means the arc traversed is proportionate to the travel of the piston of the engine on the one hand and to the indicated pressure on the other hand; the reading of the arc traversed is therefore proportionate to the power of the engine. The adhesion pressure of the friction wheel $g$ may be regulated by means of a sliding weight $l$ adjustable on an arm $p$ of the framing $h$, or by means of a suitable spring (not shown) acting upon the arm $p$ or upon the framing $h$ itself.

The following conditions will show how important the exact determination of the adhesion pressure of the friction wheel is for the practical utility of the apparatus. To prevent the friction wheel from sliding on its support (the upper end face of the drum $b$) the moment of the friction must be smaller than the greatest angular acceleration of the friction wheel multiplied by the moment of inertia of the friction wheel. The friction wheel $g$ travels forward with the to and fro or reciprocating motion in the counting direction, that is to say, during the forward movement of the engine it rolls through a given arc traveling back through a part of this arc during the succeeding return movement. With an apparatus of the present construction about five revolutions of the machine are required for a complete rotation of the friction wheel, accordingly if for example ten minutes were counted (the usual interval for taking diagrams) and the engine making 150 revolutions, the error in reading the counter mechanism if one complete revolution of the friction wheel were neglected, would only amount to one-third per cent. If one complete revolution of the friction-wheel is neglected, then five revolutions of the engine, *i. e.*, five complete diagrams of the engine are neglected: suppose, now, the apparatus has worked over ten minutes, the engine running with 150 revolutions per minute, then 1,500 diagrams must be registered by the apparatus. The neglecting of five diagrams of these involves an error of 5/1500=1/3%. As the apparatus is adapted for counting up to 100,000 it is able to count for ten hours without interruption.

In the modification shown and disclosed by Figs. 3 to 6 the spindle $e$ is journaled in a framing $h^1$ having a somewhat altered form, the counting disk mechanism $i$ $i^1$ $i^2$ $i^3$ and the arm $p$ being dispensed with. Instead of a fine worm $m$ the spindle $e$ is provided with a coarse worm $m^1$ engaging a star-wheel $q$ rotatable on an axle-journal $r$ mounted at right angles to the spindle $e$ on the framing $h^1$ by means of a plate $s$ attached to the framing but insulated therefrom by means of an ebonite washer $t$. The plate $s$ carries a terminal $u$ the arrangement being thus that the latter is in constant electric connection with the star-wheel $q$. The free end face of the hub of the star wheel is provided with an ebonite plug $v$ having embedded a copper pin $w$; one end of the latter being connected with the star-wheel, the other end being flush with the end face of the plug $v$. When the star-wheel is rotated the pin $w$ passes once at each full rotation of the star-wheel a contact spring $x$ resting against the end face of the plug $v$. The spring $x$ is in constant electric connection with a terminal $y$ attached to the other side of the framing $h^1$ but insulated therefrom by an ebonite plate $z$. To the terminals $u$ and $y$ are connected the ends of a wire 2 forming an electric circuit including a battery 3 and an electromagnetic counter and reading device 4 of well known construction.

The function of the modified apparatus is as follows: The friction-wheel, though exercising a reciprocating rotary motion, gives a positive progress in the counting direction, the angle, corresponding with the outstroke of the engine piston being superior to that of the return stroke. The clearance of the teeth of worm $m^1$ and star wheel $q$ is sufficient, as only to transmit the difference of the arcs of the reciprocating motion of the friction wheel, thus only registering this difference. But when the friction wheel travels forward in order to make a forward transportation the worm $m^1$ acts upon the star wheel rotating it for a certain angle depending on the largeness of the diagram, the ratio being 1 to 6, that is to say, when the friction wheel $q$ has made six revolutions the star-wheel has performed only one complete revolution and made by means of the copper pin $w$ only once a contact with the spring $x$ in order to close the circuit 2 of the remote counter and reading device 4 and to effect thereby in well known manner an operation of the said device for one figure. When the star wheel starts its next step for the next full rotation the pin $w$ leaves the spring $x$ thereby opening the circuit again. The main advantage of this construction is that the registrations of any number of indicators can be transmitted to any place and the readings can be taken at this place where the corresponding electromagnetic counter and reading devices are installed. Also in this construction are the swinging masses much smaller than in mechanical counter and reading devices.

We claim:

1. In an apparatus of the character described, the combination with the indicating drum, the calibrated spring and piston rod of an engine indicator; of a friction wheel contacting with and driven by said drum, a spindle on which said wheel is mounted, means connecting the spindle to the piston rod of the indicator to traverse said wheel and spindle with respect to the drum and a registering mechanism operated from said wheel.

2. In an apparatus of the class described, the combination with the indicating drum, the calibrated spring, and piston rod of an engine indicator; of a friction wheel maintained in frictional engagement with the end of said drum, a frame in which said wheel is mounted, a bell-crank lever to which said frame is pivoted and pivotally connected to the piston rod, a registering mechanism carried by the frame to register the rotations of said wheel and means to vary the pressure of the wheel on the cylinder.

3. In an apparatus of the character described, the combination with the indicating drum, the calibrated spring, and piston rod of an engine indicator; of a friction wheel maintained in frictional engagement with the end of said drum, a frame in which said wheel is mounted, a bell-crank lever to which said frame is pivoted and pivotally connected to the piston rod, a registering mechanism carried by the frame to register the rotations of said wheel and an adjustable weight to vary the pressure of the wheel on the cylinder.

ANTON FRIEDRICH CLAUS BÖTTCHER.
LUDWIG WILHELM LEHMANN.

Witnesses:
 MAX A. G. LEMCKE,
 ERNEST H. L. MUMMENHOFF.